Aug. 13, 1963   C W. MUSSER ETAL   3,100,394
PIEZOELECTRIC GAGE MOUNT
Filed March 4, 1960

INVENTOR.
C WALTON MUSSER
MATTHEW MOLDOFSKY
BY
ATTORNEYS:

United States Patent Office 3,100,394
Patented Aug. 13, 1963

3,100,394
PIEZOELECTRIC GAGE MOUNT
C Walton Musser, Beverly, Mass., and Matthew Moldofsky, Philadelphia, Pa., assignors to the United States of America as represented by the Secretary of the Army
Filed Mar. 4, 1960, Ser. No. 12,681
1 Claim. (Cl. 73—167)
(Granted under Title 35, U.S. Code (1952), sec. 266)

The invention described herein may be manufactured and used by or for the Government for governmental purposes without the payment to us of any royalty thereon.

This invention relates to mounts for piezoelectric gages and more especially to an improved piezoelectric gage mount which is capable of rugged use and is less subject to vibration and misalignment than the gage mounts heretofore available.

The outstanding feature of this improved mount is that it is in the form of a yoke which (1) has at one of its sides an opening into which the piezoelectric gage is threaded and (2) encircles and is clamped to the hollow object within which the gas pressure is to be measured. This provides a rugged structure which is substantially free of vibration for the reason that the clamping pressure tends to preload the yoke in the direction in which the gas pressure is applied.

The invention will be better understood from the following description when considered in connection with the accompanying drawings and its scope is indicated by the appended claim.

Figure 2:
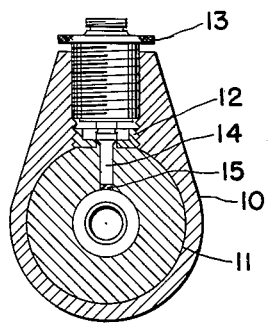
Figure 1:
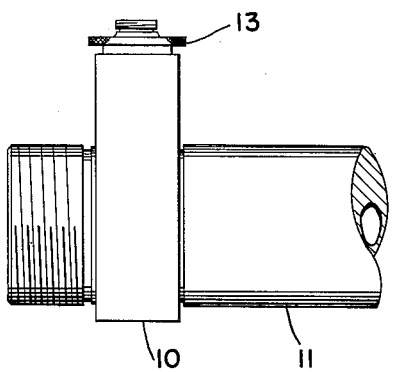
Figure 4:
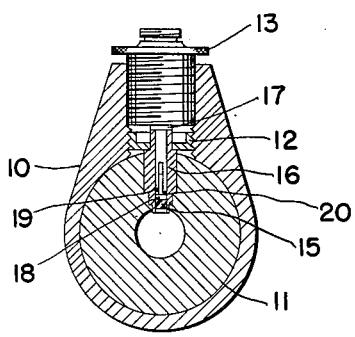
Figure 3:
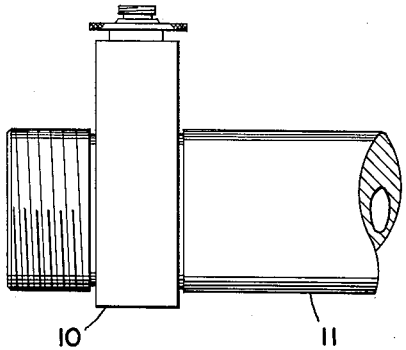
Figure 5:
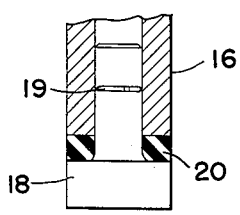

Referring to the drawings:
FIGS. 1 and 2 are different views of the preferred form of the invention,
FIGS. 3 and 4 are similar views of a modification, and
FIG. 5 illustrates a detail of this modification.

In these figures the invention is shown as used to measure the gas pressure generated within a gun barrel. Obviously it has other applications where the gas pressure within a container is to be measured.

The gage mount of FIGS. 1 and 2 is a pear-shaped ring 10 which fits around the barrel 11 with the neck of the pear having an opening into which are threaded a retainer 12 and a piezoelectric gage 13. The barrel 11 has a perforation which is aligned with the opening in the yoke 10 and is surrounded by a cylindrical portion which is spot-milled from this barrel concentric with it. The retainer 12 is screwed tightly against this milled surface and the hole in the retainer closely fits the cylindrical portion thus assuring concentricity of the center of the piezoelectric gage with a piston 14 through which the gas pressure is applied to the piezoelectric gage. At the same time, the stress between the milled surface and the retainer 12 tends to preload the yoke in the direction of pressure application so as to minimize vibration of the mount.

The piston 14 has at its inner end a synthetic rubber wafer 15 and extends through the retainer 12 into contact with the gage 13 which may have a construction such as that disclosed by a copending application of C Walton Musser and Lloyd W. Insetta, Serial No. 413,974, filed March 3, 1954, for "Piezoelectric Gage," now Patent No. 2,842,686.

The modification of FIGS. 3 and 4 is adapted to use where super-accuracy in pressure readings is desired or where a worn pressure hole in a barrel pevents satisfactory readings. It includes, in addition to the parts previously mentioned, a bushing 16 which has a large central part and small end parts.

In this arrangement, the retainer 12 rests against the central enlargement of the bushing 16, and the piston 14 is replaced by an outer piston 17 and an inner piston 18 which has a snap ring 19 interposed between it and the outer piston. Pressure is transmitted from the piston 18 to the piston 17 through a synthetic rubber washer 20.

The use of the additional bushing 16, provides a better working surface for the pistons than is obtained by boring a hole in the barrel. This is because the bushing may be made of a harder material, and is smaller in size so that it is readily ground and lapped. This serves to minimize frictional effects when the rubber rings are expanded against the side wall by the gas pressure.

The preloading of the yoke in the direction of the applied pressure by the retainer 12 tightly pressing against a concentric flat surface on the gun barrel as shown preferably in FIG. 2, has been found to be a deterrent to vibrations in the amount tending to loosen the preloading stress. More than half the yoke including that below the axis of the gun barrel is shown in the drawing as being of generally uniform thickness and uniform radial cross section. The pear shaped neck is thicker. When a piezoelectric crystal or gage is mounted in the yoke neck with piston 14 (FIG. 2) in contact with such gage, the yoke may be preloaded in tension with the inevitable result that retainer 12 and gage 13 are not likely to become loosened and out of adjustment with repeated firing of the gun. The lower portion of the loke preloaded in tension acts like a spring and thus preventing the retainer 12 and gage 13 becoming freed of stress, there being less vibration and less chance of either of them coming out of adjustment than if they were not so constrained. One purpose of the synthetic rubber wafer 15 is to minimize the danger of erosion of the piston from hot gases.

We claim:
A gun barrel having a bore and having in combination therewith a mount for a piezoelectric gage, said mount comprising a pear shaped yoke having substantially uniform thickness for over half its extent and provided with a threaded opening through the neck of the pear shaped yoke, said neck being thicker than the yoke portion which is opposite thereto, a piezoelectric gage being threaded into said neck, said yoke fitting around said barrel and having its threaded opening aligned with a barrel opening normal to the bore, a piston in said barrel opening which is normal to said bore and extending into said yoke opening in contact with said gauge, a flat portion on said barrel concentric with said openings and piston, a retainer threaded into the threaded yoke neck opening and bearing tightly against said flat portion on the barrel to initially preload said yoke in tension and to assure concentricity of the piston with said yoke and its opening, whereby said yoke may be preloaded in the direction of pressure application to the barrel and yoke to reduce the effects of mount vibration, and means including a synthetic rubber wafer at an inner end of said piston within the barrel opening which is normal to the bore for reducing erosion at an inner end of said piston due to hot gases.

References Cited in the file of this patent
UNITED STATES PATENTS

| | | |
|---|---|---|
| 2,096,826 | Schrader | Oct. 26, 1937 |
| 2,347,188 | Garand | Apr. 25, 1944 |
| 2,748,602 | Weber | June 5, 1956 |
| 2,799,788 | Fitzgerald et al. | July 16, 1957 |
| 3,013,207 | Schwalbe et al. | Dec. 12, 1961 |